(12) United States Patent
O'Doan

(10) Patent No.: US 7,845,456 B1
(45) Date of Patent: Dec. 7, 2010

(54) APPARATUS AND METHOD FOR STOPPING AN UNAUTHORIZED VEHICLE POWERED BY AN INTERNAL COMBUSTION ENGINE

(76) Inventor: Thomas F. O'Doan, P.O. Box 83, Buffalo Gap, SD (US) 57722

( * ) Notice: Subject to any disclaimer, the term of this patent is extended or adjusted under 35 U.S.C. 154(b) by 710 days.

(21) Appl. No.: 11/418,776

(22) Filed: May 6, 2006

(51) Int. Cl.
*B60R 25/00* (2006.01)

(52) U.S. Cl. .......................... 180/287; 169/62; 89/1.11

(58) Field of Classification Search ................. 169/36, 169/52, 54, 61, 62, 70, 71, 91, 68; 244/129.2, 244/114 R, 121; 89/1.11; 180/287
See application file for complete search history.

(56) References Cited

U.S. PATENT DOCUMENTS

| | | | |
|---|---|---|---|
| 1,928,909 A | | 10/1933 | Reasor |
| 4,818,970 A | * | 4/1989 | Natale et al. ........... 340/539.26 |
| 5,154,238 A | * | 10/1992 | Buchan ....................... 169/62 |
| 5,507,350 A | | 4/1996 | Primlani |
| 5,808,541 A | * | 9/1998 | Golden .................. 340/286.05 |
| 5,848,650 A | * | 12/1998 | Brady .......................... 169/36 |
| 6,732,725 B2 | * | 5/2004 | Doud ........................... 124/27 |
| 7,056,054 B1 | * | 6/2006 | Keith et al. .................... 404/6 |
| 2005/0126796 A1 | | 6/2005 | Sant'Angelo |
| 2005/0150663 A1 | * | 7/2005 | Fabre et al. .................... 169/43 |

OTHER PUBLICATIONS

Hunter, W., "Run Away Diesel,", MERCEDESSHOP, Aug. 14, 2004, www.mercedesshop.com.
FE-13, Halon 1301, Inergen, Carbon Dioxide Fire Suppression Systems, Online sales.
sheets, www.reliablefire.com, Reliable Fire Equipment Co. 12485 S. Cicero Ave., Alsip, IL 60803-3083.

* cited by examiner

*Primary Examiner*—Benjamin P Lee
(74) *Attorney, Agent, or Firm*—Richard L. Marsh

(57) ABSTRACT

An apparatus for arresting the advancement of an unauthorized vehicle comprises at least one discharge port, at least one storage vessel, at least one valve and a means for actuation, said storage vessel containing a volume of gas that does not support combustion, said discharge port directed toward a point in a path of said unauthorized vehicle wherein said means for actuation actuates said valve to deliver a quantity of said gas from said discharge port into said path of said unauthorized vehicle to stall an engine powering said unauthorized vehicle.

3 Claims, 4 Drawing Sheets

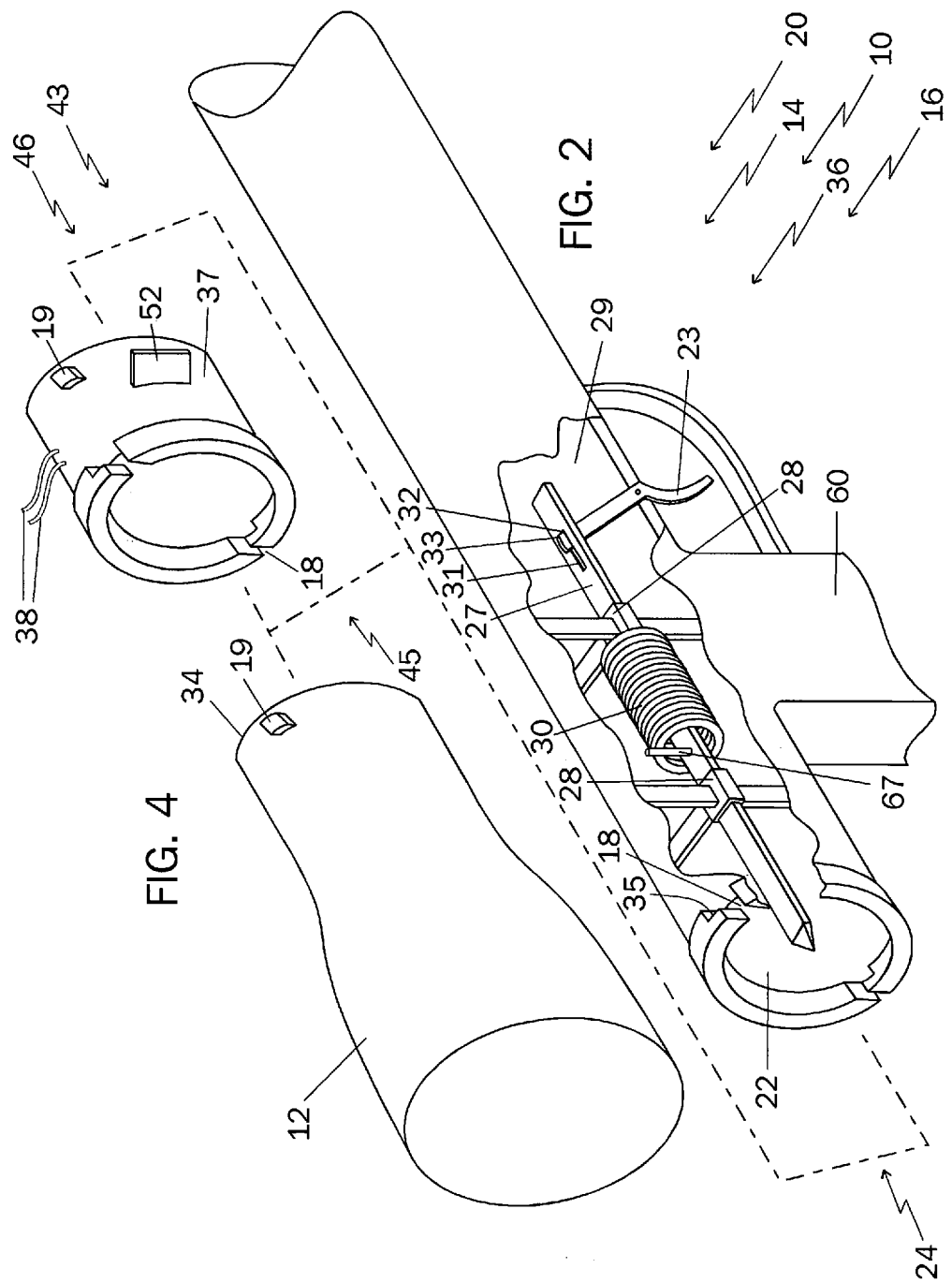

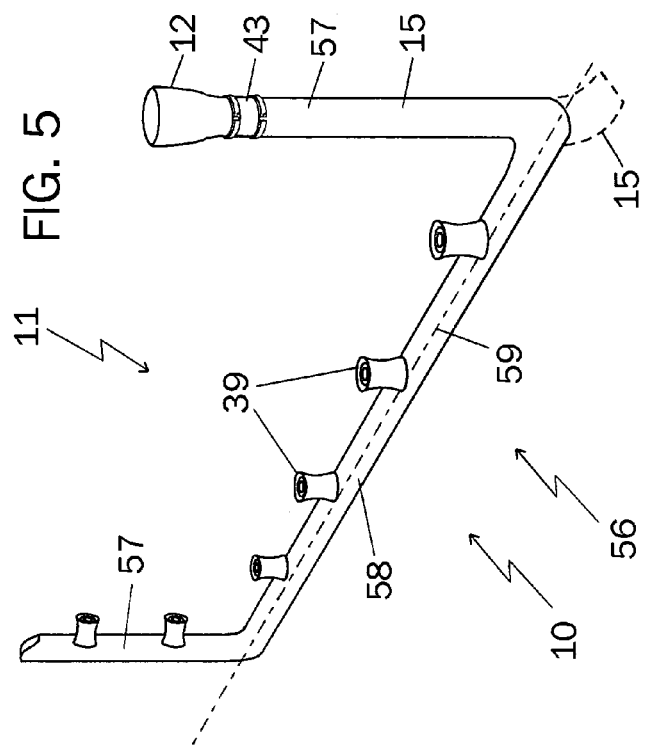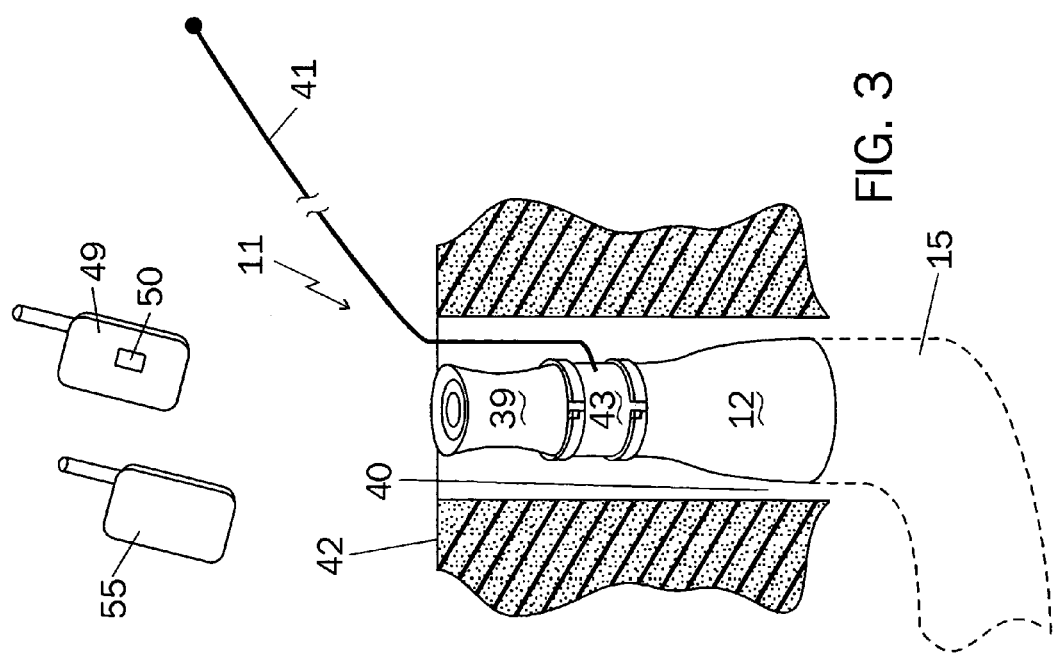

APPARATUS AND METHOD FOR STOPPING AN UNAUTHORIZED VEHICLE POWERED BY AN INTERNAL COMBUSTION ENGINE

BACKGROUND OF THE INVENTION

1. Field of the Invention

This invention relates to a method and apparatus for stopping an internal combustion engine and more particularly, for use by persons defending national interests by arresting the advancement of unauthorized vehicles. Stopping of terrorist driven vehicles well in advance of the selected target is of prime interest.

2. Prior Art Statement

It is known to stop a runaway diesel by introducing a large quantity of either Halon or CO2 into the air intake manifold to replace the combustible air with a non-combustible gas thus smothering the engine. For instance, see the article by Hunter, W., "Run Away Diesel," *MercedesShop*, Aug. 14, 2004. Smothering an engine by this method requires close proximity to the intake manifold or an installed system onboard the vehicle that is actuated by the driver. Since the driver of unauthorized vehicle would not desire to stop the engine, any onboard system is of little value. Therefore, there is a great need for an apparatus that discharges a habitable gas in sufficient quantity to arrest the advancement of any vehicle powered by an internal combustion engine in order to provide safety to persons defending national interests.

It is also known to smother a fire in a room with an installed fire suppression system. For instance, see the FE-13, Halon 1301, Inergen or Carbon Dioxide Fire Suppression Systems sold by the Reliable Fire Equipment Company, 12845 South Cicero Ave., Alsip, Ill. 60803-3083. As above, a driver of an unauthorized vehicle will have no interest in stopping the vehicle prior to destruction of the target for which the vehicle is headed. Thus, there is a great need to arrest the advancement of unauthorized vehicles well in advance of the selected target area by stopping the internal combustion engine. Stopping of the engine may be accomplished by deploying a quantity of habitable, but not combustion supporting, gas at an area away from any selected target by hand held means or by a semipermanent installation of discharge nozzles in the path of the vehicle.

It is further known to project a container or capsule of fire suppressant into a fire or in advance of a fire to assist in controlling the spread of a fire or for suppressing the fire. For instance, see U.S. Pat. No. 1,928,909 issued on 3 Oct. 1933 to Edward J. Reasor wherein bomblets are fired from a cannon into building or see the U.S. Pat. No. 5,507,350 issued on 16 Apr. 1996 to Indru J. Primlani where capsules of carbon dioxide are fired from artillery guns in advance of, and into, a fire to suppress the fire. There is still a need to discharge a sufficient quantity of habitable gas that does not support combustion in an area remote from a desirable target in order to stop the advancement of an unauthorized vehicle toward the target.

Finally, it is known to provide a transportable system for delivering a breathable, fire extinguishing gas to an enclosed fire comprising from about 81 to 88 percent by volume gaseous inert material and from about 5 to about 2 percent carbon dioxide and from about 15 to about 10 percent oxygen. For instance, see the U.S. Patent Application Publication 2005/0126796 A1 published on 16 Jun. 2005 to Joseph Germano Sant' Angelo. The gases may be separately stored in high pressure vessels or in doers as a liquid, mixed and heated prior to discharging through an extensible conduit, such as a conventional fire hose, to the point of the fire. It is obvious that since the mixture must be delivered to the fire zone by a hose, proximity of personnel to the point of attack is required. Therefore, an apparatus that can deliver a charge of habitable gaseous mixture to a point remote from a desirable target is greatly needed.

SUMMARY OF THE INVENTION

It is an object of this invention to provide an apparatus for arresting the advancement of an unauthorized vehicle that comprises at least one discharge port, at least one storage vessel, at least one valve and a means for actuation, the storage vessel containing a volume of gas that does not support combustion, the discharge port directed toward a point in a path of the unauthorized vehicle wherein the means for actuation actuates the valve to deliver a quantity of the gas from the discharge port into the path of the unauthorized vehicle to stall an engine powering the unauthorized vehicle.

It is also an object of this invention to provide an apparatus for arresting the advancement of an unauthorized vehicle that comprises at least one discharge port, at least one storage vessel, at least one valve and a means for actuation wherein the discharge port is a muzzle of a weapon, the weapon carrying the storage vessel, the valve and the means for actuation.

A further object of this invention is to provide an apparatus for arresting the advancement of an unauthorized vehicle that comprises at least one discharge port, at least one storage vessel, at least one valve and a means for actuation wherein the means for actuation is manually actuated such as by a trigger on a weapon or a keypad on a hand held transmitter.

Still another object of this invention is to provide an apparatus for arresting the advancement of an unauthorized vehicle that comprises at least one discharge port, at least one storage vessel, at least one valve and a means for actuation wherein the weapon is a shoulder mounted device with the storage vessel removably installed adjacent an end opposite the muzzle of the shoulder mounted device. Additionally, the apparatus may be a smaller weapon similar to a pistol having the storage vessel housed in the handle.

One feature of this invention is to provide an apparatus for arresting the advancement of an unauthorized vehicle that comprises at least one discharge port, at least one storage vessel, at least one valve and a means for actuation wherein the valve is integral with the storage vessel or made integral with the shoulder mounted device.

One aim of this invention is to provide an apparatus for arresting the advancement of an unauthorized vehicle comprises at least one discharge port, at least one storage vessel, at least one valve and a means for actuation, the storage vessel containing a volume of gas that does not support combustion, the discharge port disposed in a path of the unauthorized vehicle wherein the means for actuation actuates the valve to deliver a quantity of the gas from the discharge port into the path of the unauthorized vehicle to stall an engine powering the unauthorized vehicle.

One goal of this invention is to provide an apparatus for arresting the advancement of an unauthorized vehicle that is disposed in a path of the unauthorized vehicle wherein the discharge port comprises at least one nozzle fixedly disposed in the path. The discharge port may comprise a plurality of nozzles arranged in an array wherein the array comprises an U-shaped portal disposed across the path either transversely or at an angle to the axis of the path. In another embodiment, the apparatus may comprise a plurality of nozzles disposed in an array along the linear axis of the path or a combination of U-shaped portals disposed across the path.

A principal aim of this invention is to provide an apparatus for arresting the advancement of an unauthorized vehicle comprises at least one discharge port, at least one storage vessel, at least one valve and a means for actuation, the storage vessel containing a volume of gas that does not support combustion, the discharge port disposed in a path of an unauthorized vehicle wherein the storage vessel is removably affixed to the nozzle of the discharge port, the valve is integral with the storage vessel and the means for actuation is mechanical or electro-mechanical.

Another goal of this invention is to provide an apparatus for arresting the advancement of an unauthorized vehicle comprises at least one discharge port, at least one storage vessel, at least one valve and a means for actuation, the storage vessel containing a volume of gas that does not support combustion, the discharge port disposed in a path of the unauthorized vehicle wherein the discharge port is operatively connected to an end of the conduit, another end of the conduit is connected to the storage vessel, the valve is disposed in the conduit and wherein the means for actuation is disposed remote from the storage vessel and wherein the means for actuation is a solenoid operatively connected to the valve the may have a means for actuation that comprises a transmitter and a receiver, the receiver operatively connected to the solenoid, the solenoid actuated by a signal received by the receiver. The apparatus may alternately be activated by a device carried by authorized personnel.

One significant feature of this invention is to provide an apparatus for arresting the advancement of an unauthorized vehicle comprises at least one discharge port, at least one storage vessel, at least one valve and a means for actuation, the discharge port disposed in a path of the unauthorized vehicle wherein the means for actuation additionally comprises a roadway sensor and an IFF device, the roadway sensor having the transmitter associated therewith, the roadway sensor disposed in the path, wherein authorized vehicles carry the IFF device and wherein when the roadway sensor detects the absence of the IFF device, the transmitter sends an actuating signal to the receiver.

Though not limited to only the objects recited herein, another aim of this invention is to provide an apparatus comprising a plurality of discharge ports, at least one storage vessel, a plurality of valves and a means for selectively actuating at least one of the plurality of valves, the storage vessel containing a volume of gas that does not support combustion, at least one of the plurality of discharge ports directed toward a point in intake air path of each engine of a multi-engine aircraft wherein the means for actuation actuates at least one valve to deliver a quantity of the gas from the discharge port into the intake air path of a selected one of the engines to temporarily stall the engine to provide for steering of the aircraft.

BRIEF DESCRIPTION OF THE DRAWINGS

FIG. 2 is a perspective view of the preferred embodiment of the weapon of FIG. 1 showing one means for actuation in the cutaway.

FIG. 3 is an enlarged sectional view of a roadway showing an alternate deployment of the apparatus of FIG. 1.

FIG. 4 is a perspective view of a valve assembly employed by the apparatus.

FIG. 5 is a greatly enlarged perspective view of an array of valve assemblies of the apparatus of FIG. 1.

DESCRIPTION OF THE PREFERRED EMBODIMENTS

While the various features of this invention are hereinafter described and illustrated as an apparatus for arresting the advancement of an unauthorized vehicle that comprises at least one discharge port, at least one storage vessel, at least one valve and a means for actuation, the storage vessel containing a volume of gas that does not support combustion, it is to be understood that the various features of this invention can be used singly or in various combinations thereof apparatus for arresting the advancement of an unauthorized vehicle as can hereinafter be appreciated from a reading of the following description.

Figure 1:
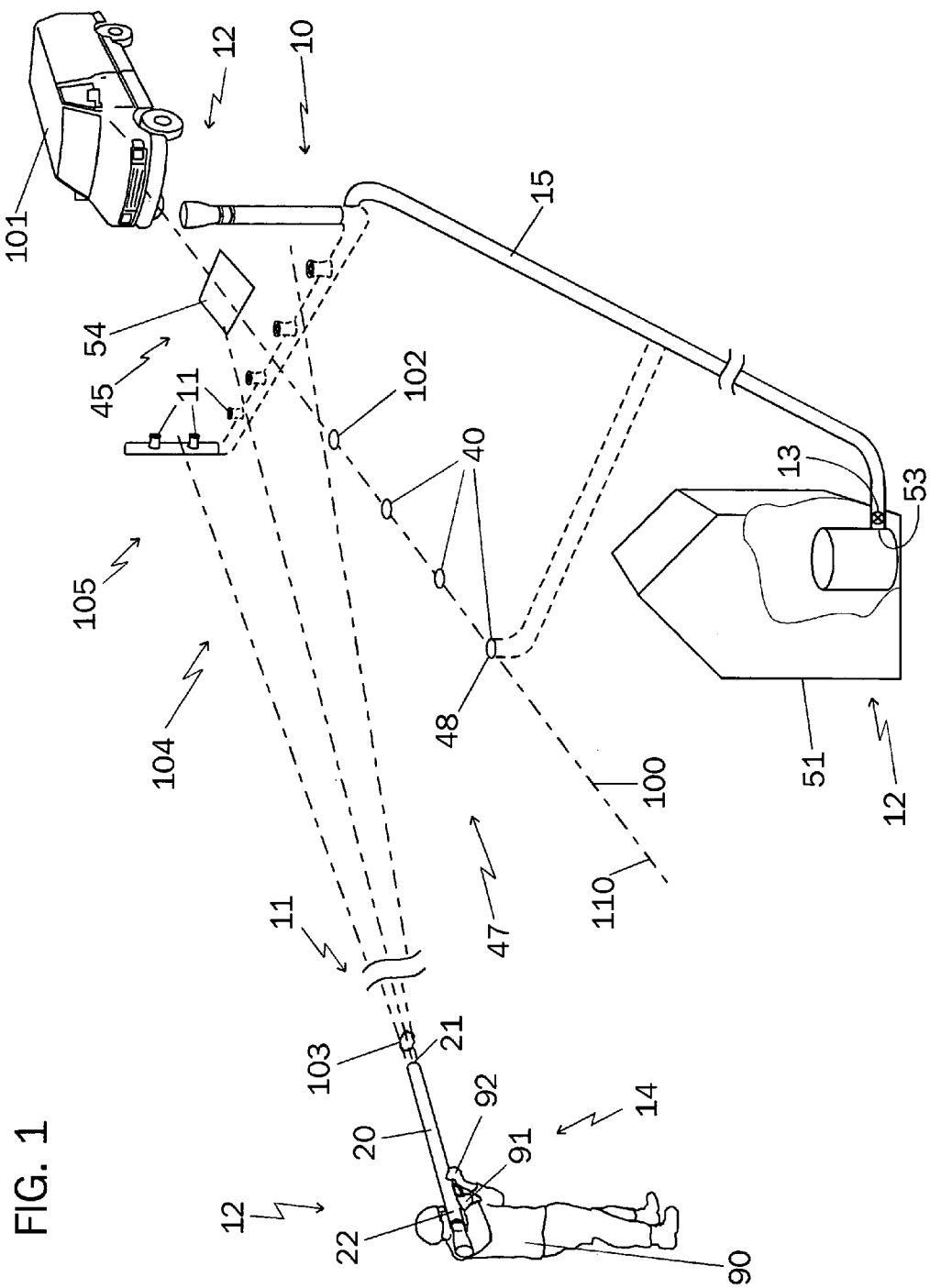
FIG. 1 is a perspective view of the methods and apparatus of this invention.
Figure 6:
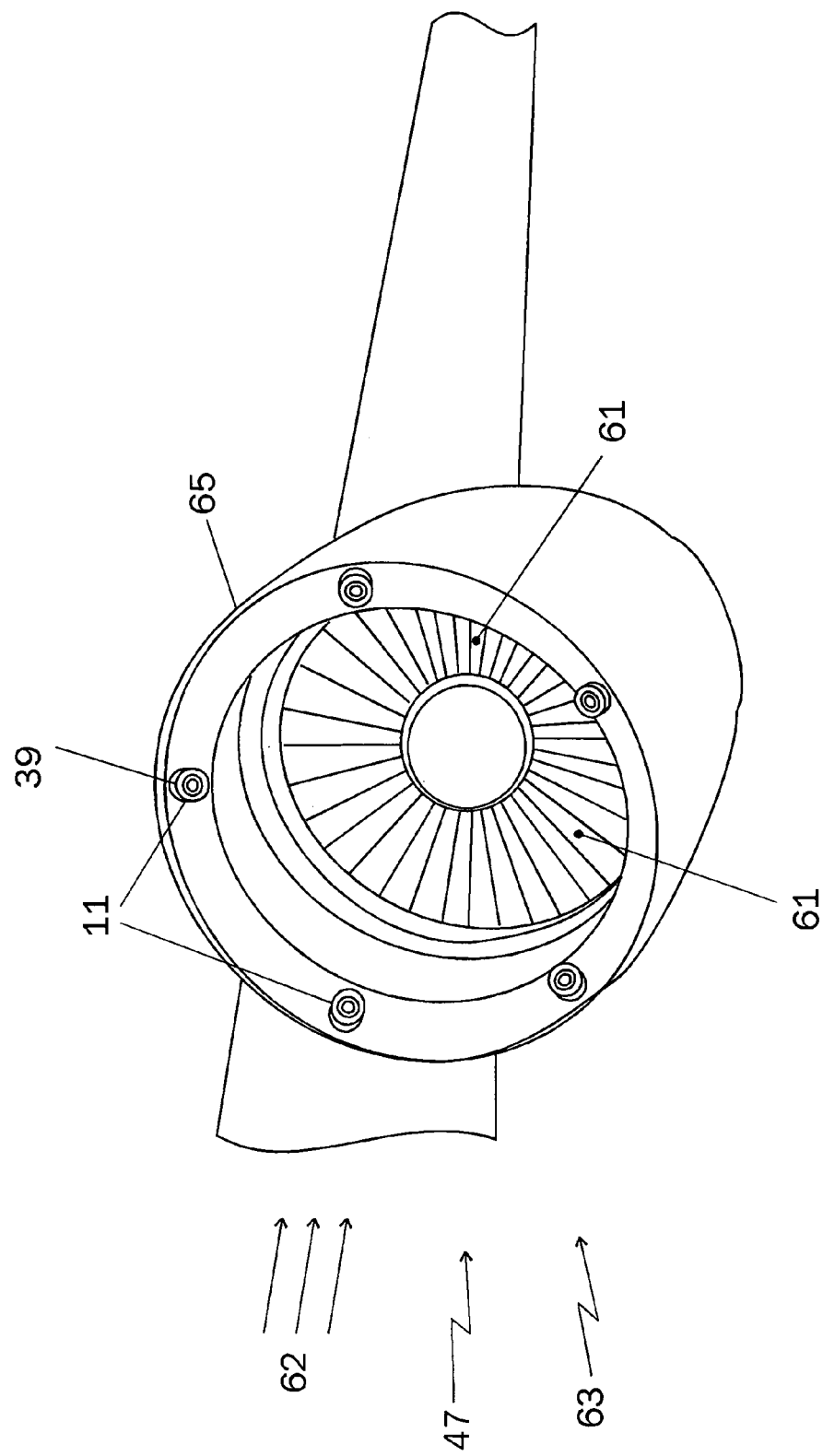
FIG. 6 is an enlarged view of the intake cowling of an aircraft engine having an array of valve assemblies of the apparatus of this invention.

Referring now to FIG. 1, an apparatus for arresting the advancement of an unauthorized vehicle, generally shown by the numeral 10, comprises at least one discharge port 11, at least one storage vessel 12, at least one valve 13 and a means for actuation 14. Storage vessel 12 contains a volume of gas that does not support combustion which may further be a habitable gaseous mixture, the purpose of which will be described hereinafter. In the first embodiment of a weapon 16, discharge port 11 is generally directed toward a point 102 in a path 100 of the unauthorized vehicle 101, point 102 in a larger general area 104 shown by a cloud 105 of gas. The nature of the gas comprising cloud 105 of gas will be fully disclosed hereinafter. Means for actuation 14 actuates valve 13 to deliver a bolus of gas 103 from discharge port 12 into path 100 of unauthorized vehicle 101, bolus 103 of gas expanding into cloud 105 of gas to stall an engine, not shown, powering unauthorized vehicle 101. Valve 13 for weapon 16 is best observed in FIG. 2 wherein parts of weapon 16 have been cutaway to show internal features. Referring also to FIG. 2, discharge port 12 is a muzzle 21 of conduit 15 of weapon 16, weapon 16 also carrying storage vessel 12, valve 13 and means for actuation 14 wherein means for actuation 14 is generally manually actuated. Accordingly, in weapon 16, means for actuation 14 is preferably a trigger 23 as is conventional with firing type weapons wherein personnel 90 carrying weapon 16 actuates means for actuation 14 with one finger 92 of one hand 91 while steadying weapon 16 with the other hand 93.

Continuing with FIG. 2, weapon 16 is preferably shoulder mounted device 20 wherein storage vessel 12 is removably installed upon an end 22 of conduit 15 opposite muzzle 21 of shoulder mounted device 20. Preferably, end 22 is provided with a quick release mechanism 24 which allows for rapid reloading of storage vessel 12 as in one embodiment of valve 13, valve 13 is integral with storage vessel 12 and may comprise a seal 25 which is puncturable. Seal 25 may be pierced with a point 26 of a spike 27 reciprocally mounted in journals 28 within an internal chamber 29 of shoulder mounted device 20, spike 27 is preferably biased toward end 22 by a spring 30 abutting one journal 28 and driving spike 27 with a pin 31 through spike 27. Upon puncturing seal 25, the release of gas 103 into chamber 29 provides sufficient force on spring 30 to reset spike 27 onto trigger latch 32. Though a simple trigger latch 32 is shown as a slot 31 in spike 27 with a nub 33 of trigger 23 protruding therethrough in FIG. 2, other latches as are well known in weaponry may be employed without departing from the scope of this invention. In this embodiment, shoulder mounted device 20 is rested on one shoulder 94, steadied thereon with other hand 93 while aiming and actuating means for actuation with one hand 91. Quick release mechanism 24 of weapon 16 preferably comprises a ring 17 disposed on end 22 of weapon 16, ring 17 having at least one slot 18 disposed therethrough wherein slot 18 receives a post 19 disposed on storage vessel 12. Thus, storage vessel 12 has a nose 34 thereof inserted into end 22 of weapon 16 with post 19 aligned with slot 18 wherein a slight clockwise rotation of storage vessel 12 locks storage vessel 12 upon end 22 as post 19 slides along a tapered edge 35 of slot 18 upon rotation of storage vessel 12. Likewise, when storage vessel 12 has been spent, the spent storage vessel 12 may be quickly released from end 22 by a quick counterclockwise rotation of vessel 12 thus unlocking post 19 from tapered edge 35 wherein vessel 12 is withdrawn from end 22 while withdrawing post 19 through slot 18. Preferably, weapon 16 will fire a bolus 103 of gas to point 102 at a distance of up to 150 meters remote from person 90 to arrest advancement of unauthorized vehicle 101 at a safe distance from person 90. Bolus 103 will begin to disperse upon exit from muzzle 21 and expand to a size generally spanning at least the width of the path of vehicle 101 and the height of vehicle 101 thus effectively describing general area 104 such that vehicle 101 must pass through cloud 105 of gas. Upon ingesting a portion of cloud 105 of gas in the intake air stream of unauthorized vehicle 101, the engine driving unauthorized vehicle 101 will stall as insufficient oxygen is available in cloud 105 of gas to support combustion. It has been found by the inventor hereof that the engine of unauthorized vehicle 101 may remain stalled for up to 3 minutes before being able to be restarted thus allowing time to clear the area around unauthorized vehicle 101 and apprehend the occupants thereof.

Though weapon 16 has been described above as a shoulder mounted device 20, weapon 16 may also be a hand held device such as a pistol 36 wherein pistol 36 has features similar to shoulder mounted device 20 though made smaller to fit within the confines of a hand held device. Pistol 36 may be employed by sentries to stop a vehicle which has failed to stop as directed or which has made an unauthorized movement after stopping wherein the sentry may fire the pistol to point 102 in path 100 of vehicle 101. Pistol 36 may also be used by pursuit vehicles in the same manner merely be discharging a bolus 103 of gas to a point 102 ahead of the fleeing vehicle. Accordingly, pistol 36 has a variable choke at discharge end 21 wherein bolus 103 of gas may be made to expand more quickly in order to rapidly fill general area 104. Additionally, weapon 16 may also be used to stop an assailant by striking the assailant with bolus 103 of gas as bolus 103 of gas has an associated mass with sufficient energy when discharged from end 21 to interrupt the respiration rate of the assailant. Bolus 103 of gas will then rapidly disperse but cause no permanent harm to the assailant as cloud 105 of gas is preferably a habitable mixture that does not support combustion but does not deprive personnel of life sustaining oxygen. By capturing assailant(s), such as occupants of unauthorized vehicle 101 or an ambulatory assailant, valuable intelligence may be gathered once the threat posed by the assailant(s) has been abated. Of course, weapon 16 may take other forms and be employed for other uses without departing from the scope of this invention. Weapon 16 may have storage vessel 12 removably installed within handle 60.

In alternate embodiments, valve 13 may be made integral with weapon 16, valve 13 actuated by means for actuation 14 while in other alternate embodiments, valve 13 may be made integral with storage vessel 12. For instance, valve 13 may be a ball, gate, butterfly or lens valve that is rapidly opened upon actuation of means for actuation 14. Accordingly, valve 13 may be a valve assembly 43 as shown in FIG. 4 wherein valve 13 has a solenoid 37 associated therewith, solenoid 37 actuated by an electric signal from means 14 for actuation. Of course, it is fully within the scope of this invention to mechanically actuate valve 13 of a valve assembly 43 as will evident hereinafter. In those embodiment where valve 13 is integral with weapon 16, storage vessel 12 may have a separate valve associated with nose 34 wherein the separate valve is opened upon mounting storage vessel 12 to end 22.

Additionally, in weapon 16, spring 30 may be replaced by an electric solenoid 37 which is actuated by an electric signal from means 14 for actuation wherein trigger 23 is effectively a single pole switch. Solenoid 37 may be made integral with end 22 or may be separately mounted as valve assembly 43 on end 22 of weapon 16, storage vessel 12 then mounted to valve assembly 43. Valve assembly 43 is shown in FIG. 4 spaced from storage vessel 12, solenoid 37 of valve assembly 43 having electrical leads 38 extending therefrom, electrical leads 38 operatively connected to means 14 for actuation. Valve assembly 43 also has slot 18 disposed in a ring 44 at one end 65 thereof, slot 18 identical to slot 18 in end 22 of weapon 16, slot 18 accommodating post 19 of storage vessel 12 therein and locked there by tapered edge 35. Similarly, valve assembly 43 has post 19 disposed on an opposite end 46 thereof in order to be locked to weapon 16 or another element of apparatus 10 as will hereinafter become readily apparent. Though solenoid 37 may be employed with weapon 16, its use is generally more suitable for remote operations of apparatus 10 of this invention as will now be fully explained.

Referring again to FIG. 1 in conjunction with FIGS. 3 and 4, apparatus 10 for arresting the advancement of an unauthorized vehicle 101 may comprise at least one discharge port 11, at least one storage vessel 12, at least one valve 13 and means 14 for actuation wherein storage vessel contains a volume of gas that does not support combustion. Discharge port 11 in this embodiment is disposed in path 100 of unauthorized vehicle 101 wherein means 14 for actuation actuates valve 13 to disperse a quantity of the gas from discharge port 11 into a cloud 105 of gas directly in path 100 of unauthorized vehicle 101 to stall an engine powering unauthorized vehicle 101. As shown in FIG. 1, apparatus 10 comprises at least one discharge port 11 comprising at least one nozzle 39 fixedly disposed in path 101 and preferably comprises a array 47 of discharge ports 11 and storage vessels 12. Array 47 of discharge ports 11 and storage vessels 12 may be arranged along path 100 such that an unauthorized vehicle 101 traveling at a high rate of speed is prevented from continuing along path 100 by stalling an engine in unauthorized vehicle 101 at intervals along path 100. Array 47 may be linear as shown in FIG. 1, however, other arrays 47 may be employed without departing from the scope of this invention. In the embodiment shown in FIG. 3, storage vessel 12 is removably affixed to valve assembly 43 which is, in turn, removably affixed to nozzle 39, nozzle 39 thus placing discharge port 11 in an attitude substantially vertically. Though in FIG. 3 valve assembly 43 is shown removable from storage vessel, valve assembly with valve 13 may alternately be integral with storage vessel 12. Means 14 for actuation may be mechanical, electrical or a combination thereof. For instance, means 14 for actuation may be a simple trip wire 41 which operates valve 13 wherein apparatus 10 is disposed in a hole 40 in path 100 of a roadway 42. In this embodiment, storage vessel 12, nozzle 39 and valve 13, as an integral unit, is placed in hole 40 with trip wire 41 extending therefrom, trip wire 41 arranged across path 100 a distance up stream of hole 40 such that when unauthorized vehicle 101 runs over trip wire 41, valve 13 is actuated releasing gas from storage vessel 12 through nozzle

39, nozzle 39 rapidly dispersing the gas into cloud 105 of gas. Preferably, apparatus 10 has storage vessel 12 removably affixed to nozzle 39 of discharge port 11, valve 13 is integral with storage vessel 12 and means 14 for actuation is electro-mechanical. Thus, means 14 for actuation may additionally comprise solenoid 37 and a trip mechanism 45, solenoid 37 associated with valve assembly 43, solenoid 37 having electrical wires 38 extending therefrom. Electrical wires 38 are then attached to a trip mechanism 45 disposed in path 100 of unauthorized vehicle 101 such that when unauthorized vehicle 101 passes over trip mechanism 45, an electrical signal is sent to valve assembly 43 and gas is discharged from storage vessel 12 into cloud 105 of gas in path 100 of unauthorized vehicle 101. Mechanical trips, such as trip mechanism 45, have long been used to control traffic signals. In an alternate embodiment, an electromagnetic loop may be placed in path 100 of unauthorized vehicle 101, the electromagnetic loop comprising a portion of means 14 for actuation wherein the electromagnetic loop causes an electrical signal to be passed to solenoid 37 thus releasing gas from storage vessel 12.

Apparatus 10 may alternately have discharge ports 11 operatively associated with an end 48 of a conduit 15 wherein another end 53 of conduit 15 is connected to storage vessel 12 with valve 13 disposed in conduit 15. Means 14 for actuation is preferably disposed remote from storage vessel 12 and also preferably disposed remote from discharge port 11. Referring to FIG. 1 and to the dashed lines in FIG. 3, apparatus 10 is shown as having conduit 15 extending from valve assembly 43 in place of storage vessel 12 wherein storage vessel 12 is disposed in a sentry house 51 remote from discharge port 11, discharge port 11 disposed in hole 40 in path 100 of unauthorized vehicle 101. In this embodiment, means 14 for actuation is electro-mechanical and comprises valve assembly 43, a transmitter 49 and a receiver 52, receiver 52 operatively connected to solenoid 37 of valve assembly 43, solenoid 37 actuated by a signal received by receiver 52. Valve assembly 43 is associated with end 48 of conduit 15 and receives an electronic signal from a transmitter 49 carried by authorized personnel, such as a sentry, not shown. Preferably, transmitter 49 has at least one switch 50 thereupon for actuating valve assembly 43. Alternately, valve assembly 43 may be disposed in conduit 15 at or in the vicinity of storage vessel 12 in sentry house 51 wherein gas from storage vessel 12 is discharged through conduit 15 to at least one discharge port 11 disposed at a remote location in path 100 of unauthorized vehicle 101. Though only one discharge port 11 in one hole 40 is shown attached to conduit 15 by dashed lines, it is fully understood that multiple conduits 15 could be employed to connect all discharge ports 11 in all holes 40 to storage vessel, each discharge port 11 having a separate valve assembly 43 operated independently by hand held transmitter 49 of means 14 for actuation. Alternately, all discharge ports 11 in array 47 may be simultaneously actuated such as in an event where multiple unauthorized vehicles 101 are traveling together.

In another alternate embodiment, apparatus 10 may be fully automated wherein a sentry is not required to actuate means 14 for actuation. In this alternate embodiment, means 14 for actuation comprises a roadway sensor 54 and an Identify Friend or Foe (IFF) device 55, roadway sensor 54 having transmitter 49 associated therewith. IFF device 55 is shown in FIG. 3 adjacent transmitter 49 though it is readily apparent that IFF device 55 would be installed in all authorized vehicles wherein when roadway sensor 54 detects the presence of IFF device 55, no signal is transmitted from transmitter 49. Roadway sensor 54 is disposed in path 100 and upon detection of the absence of IFF device 55, transmitter 49 automatically sends an actuating signal to receiver 52 thus releasing gas from storage vessel 12, discharge port 11 dispersing gas into cloud 105 of gas in path 100. As with previous embodiments, at least one valve assembly 43 is actuated though it is within the scope of this invention to actuate multiple valve assemblies 43 in array 47.

Array 47 of apparatus 10 may comprise an U-shaped portal 56 disposed across the path 100 with discharge ports 11 disposed inwardly toward path 100. Referring now to FIGS. 1 and 5, U-shaped portal 56 comprises conduit 15 arranged in a U-shape with nozzles 39 joined thereto. Storage vessel 12 may be mounted on one leg 57 of U-shaped portal 56 with valve assembly 43 coupling storage vessel 12 to leg 57, storage vessel 12 removably associated leg 57. Valve assembly 43 may be mechanically or electronically actuated as previously described. Additionally, conduit 15 may extend from leg 57 toward a remote location such as sentry house 51 where storage vessel 12 is housed. It is within the scope of this invention to dispose valve assembly 43 at any location along conduit 15. Preferably, U-shaped portal 56 is semi-permanently installed in roadway 42 with legs 57 extending upwardly alongside roadway 42. Nozzles 39 may be disposed only in one leg 57, only in cross member 58 or in a combination of legs 57 and cross member 58. As shown in FIG. 1, array 47 is disposed perpendicular to the linear dimension of path 100, however, it is fully within the scope of this invention to dispose U-shaped portal 56 of array 47 at an angle relative to an axis 110 of path 100 in order to provide more flexibility for actuation of discharge ports 11 as has been described with regard to a linear arrangement of array 47. Furthermore, by disposing array 47 at an angle across path 100, it should be readily apparent that the length of cloud 105 of gas is extended along path 100 thus ensuring arresting advancement of unauthorized vehicle 101. Additionally, in order to further extend cloud 105 of gas nozzles 39 in array 47 may be disposed at different angles relative to the longitudinal axis of U-shaped portal 56.

In an important embodiment of apparatus 10 of this invention, apparatus 10 comprises a plurality of discharge ports 11 in an array 47, at least one on board storage vessel, not shown, a plurality of valves assemblies 43 and means 14 for selectively actuating at least one valve assemblies 43, storage vessel 12 containing a volume of gas that does not support combustion. Valve assemblies 43 with nozzles 39 affixed thereto are similar to nozzles 39 shown in FIG. 3, valve assemblies 43 mounted to ends of 48 of conduits 15 leading from the on board storage vessel. In array 47, at least one discharge port 11 is directed toward a point 61 in intake air path 62 of each engine 63 of a multi-engine aircraft wherein means 14 for actuation actuates valve 13 of at least one valve assembly 43 to deliver a quantity of gas from discharge port 11 into intake air path 62 of a selected one of engines 63 to temporarily stall a selected engine 65 to provide for steering of the aircraft. Means 14 for actuation is preferably a hand held transmitter 49 which is controlled by an air marshal on board the aircraft or may be integral with the navigational control system of the air craft wherein valve assembly 43 may be actuated by air traffic controllers or military pilots. By providing remote steerage to the aircraft, prevention of the use of aircraft as missiles is effected. Storage vessel 12 is a part of a flooding type fire control system of most commercial aircraft as non-combustible gas cylinders are mounted therein for control of electrical fires within confined spaces in the aircraft. By providing an array 47 of discharge ports 11 on the cowling of the engine nacelle, a degree of fine control is available to the authorized person providing steerage to the aircraft by selectively using more than one discharge port 11 to provide less combustible air to the engine. Typically, an onboard fire control system uses the fire suppression gases commercially available.

Commercially available fire suppression gases such as FE-13, Halon 1301, Inergen or Carbon Dioxide may be used to advantage in apparatus 10 of this invention, however, it is preferable that cloud 105 of gas has sufficient oxygen content to sustain life in order to apprehend personnel in unauthorized vehicle 101. Therefore, breathable fire extinguishing gas mixtures as described in U.S. Pat. No. 4,807,706, issued on 28 Feb. 1989 to Lambertsen, et al., are preferred, this patent incorporated herein by this reference thereto. The gases employed in apparatus 10 are preferably compressed sufficiently to be readily stored in relatively small storage vessels 12 yet provide sufficient volume when expanded to constitute cloud 105 of gas. Since gases employed in apparatus 10 are greatly compressed, as the gas expands it acts as its own propellant though propulsion may be enhanced by heating the gas in chamber 29 or providing a rapidly expanding gas ignited by an igniter just after bolus 103 of gas exits storage vessel 12. Expanding gas fastener drivers are well known wherein a fuel/air mixture is ignited thus providing force to drive the fastener. A typical fastener device is described in U.S. Pat. No. 6,783,047 B2 issued on 31 Aug. 2004 to Thomas Granacher, the teachings ignitable fuel/air mixtures of this patent incorporated into this disclosure by this reference thereto. Where an igniter igniting an explosive fuel/air mixture is utilized, a wad of material, similar to a shotgun shell wad, may be placed in chamber 29 between the explosive mixture and the non-combustible gas. Thus, storage chamber 12 may carry the explosive mixture in a separate compartment 64 behind the non-combustible gas, the explosive mixture comprising a part of means 14 for actuating wherein the explosive mixture is ignited by the igniter upon closure of another part of means 14 for actuation, such as an electrical switch, whether associated with trigger 23 roadway device 54 or hand held transmitter 49. Alternately, the explosive mixture and wad may be placed within handle 60 of weapon 16 or associated with a straight arm of a "T" at end 53 of conduit 15. Where an explosive mixture is used to further propel bolus 103 of gas, mechanical rupture of seal 25 is not necessary as the explosive mixture has sufficient energy to rupture seal 25 and discharge bolus 103 through conduit 15 or from weapon 16.

Bolus 103 of gas may be heated upon discharge from storage vessel 12 by heating conduit 15 preferably just after discharge of gas from storage vessel 12, however, the entire length of conduit 15 may be heated in order to provide further expansion of bolus 103 of gas. For instance, where conduit 15 is buried underground, especially in desert areas, the heat of the surrounding soil may be used. In other environs where ambient air temperature or solar exposure is great, these conditions may be used for heating. In other instances, auxiliary heating may be provided by heating elements 66 surrounding at least a portion of conduit 15 such as leg 57. Finally, where conduit 15 is mounted within a vehicle such as a chase vehicle, conduit 15 may be disposed within onboard heated areas of the vehicle such as the water jacket of the engine or the exhaust pipe.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. An apparatus for arresting the advancement of an unauthorized vehicle comprises at least one discharge port, at least one storage vessel, at least one valve and a means for actuation, said storage vessel containing a volume of gas that does not support combustion, said discharge port disposed in a path of said unauthorized vehicle, said discharge port comprising at least one nozzle fixedly disposed in said path, said discharge port operatively connected to an end of a conduit, another end of said conduit connected to said storage vessel, said valve disposed in said conduit, said means for actuation disposed remote from said storage vessel, said means for actuation being electro-mechanical and comprising a solenoid operatively connected to said valve, said means for actuation actuating said valve to deliver a quantity of said gas from said discharge port into said path of said unauthorized vehicle to stall an engine powering said unauthorized vehicle wherein said means for actuation additionally comprising a roadway sensor and an IFF device, said roadway sensor having said transmitter associated therewith, said roadway sensor disposed in said path, wherein authorized vehicles carry said IFF device and wherein when said roadway sensor detects the absence of said IFF device, said transmitter sends an actuating signal to said receiver.

2. An apparatus as in claim 1 wherein at least one discharge port comprises a plurality of nozzles arranged in an array.

3. An apparatus as in claim 2 wherein said array comprises an U-shaped portal disposed across said path.

* * * * *